May 21, 1940. H. E. WANER 2,201,510
STORAGE BATTERY COVER ASSEMBLY
Filed April 23, 1938 2 Sheets-Sheet 1
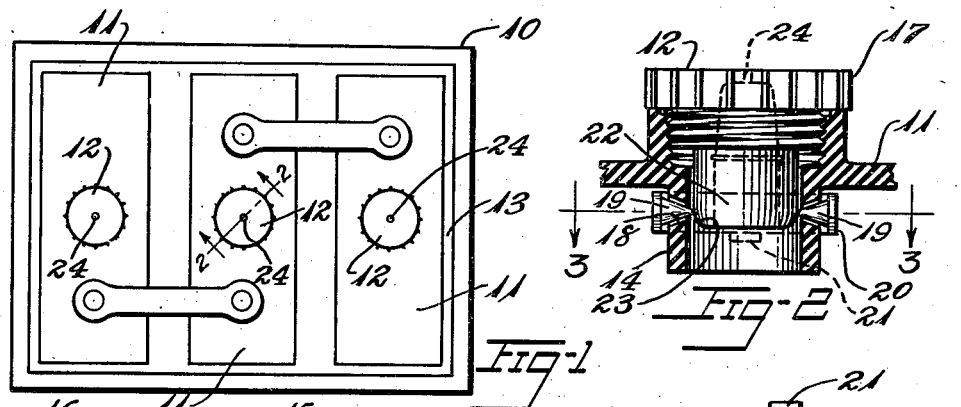
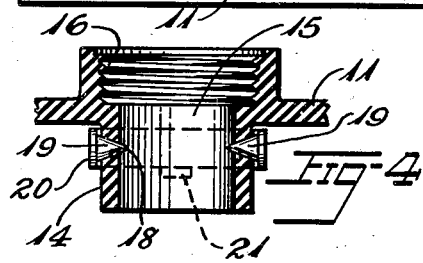
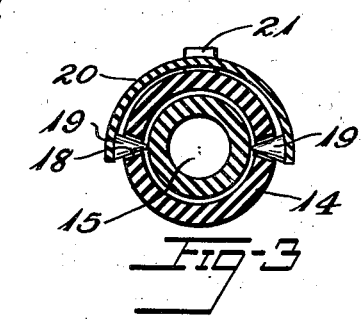
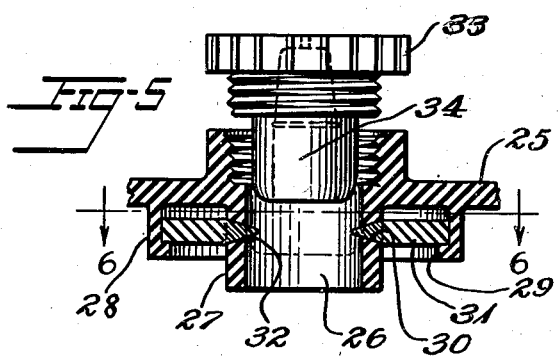
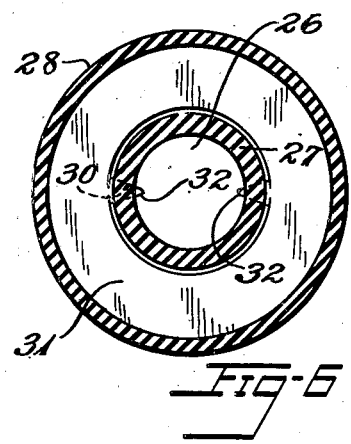
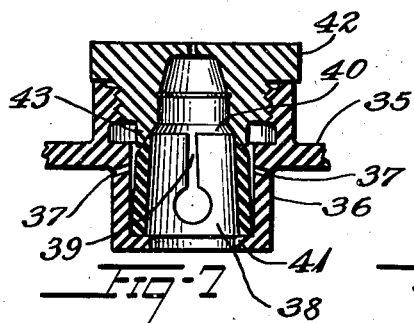
Inventor
Harry E. Waner
By Willis F. Avery
Atty.

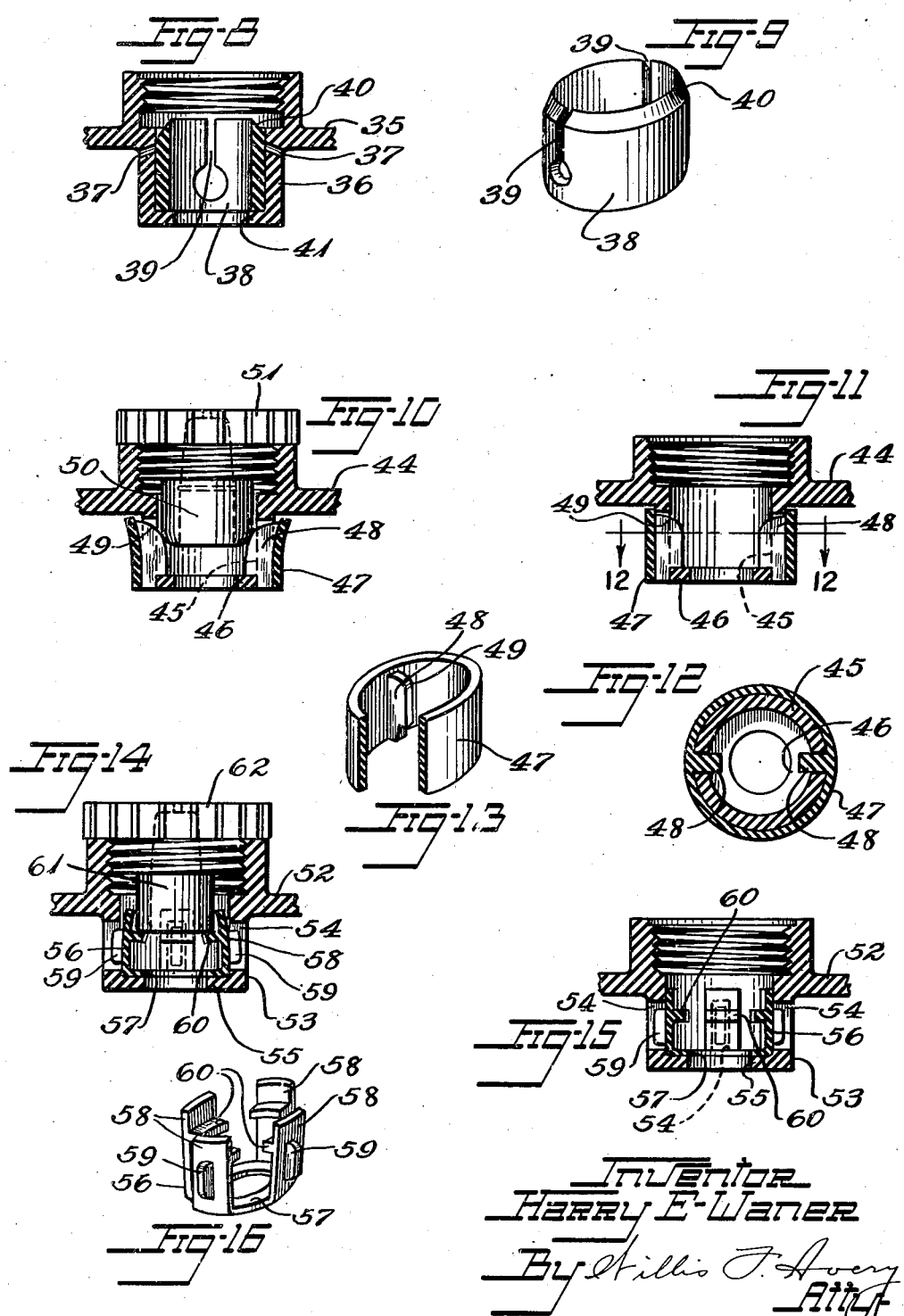

Patented May 21, 1940

2,201,510

UNITED STATES PATENT OFFICE 2,201,510

STORAGE BATTERY COVER ASSEMBLY

Harry E. Waner, Akron, Ohio, assignor to The B. F. Goodrich Company, New York, N. Y., a corporation of New York Application April 23, 1938, Serial No. 203,870

1 Claim. (Cl. 136—178)

This invention relates to storage batteries, and more especially to cell cover construction.

During use, storage batteries require the addition of water and are provided with covers having openings for filling and testing the electrolyte, which openings are normally substantially closed by vented plugs fitted thereto. It is necessary to keep the electrolyte at substantially a certain level above the plates. If the level of the electrolyte is too high, gas, which is evolved during charging of the battery, will become trapped below the cell cover where it is prevented from escape to the atmosphere by the wall of the vent well surrounding the filling opening. On the other hand, it is desirable to provide a normally impervious vent well wall to insure against over filling of the cell. Where the battery is over filled, the bubbling of gas in escaping to the vent well from the space below the cell cover, throws acid spray from the battery, a condition which is inconvenient at all times but is especially bad where the battery is located in the same compartment as motors or other mechanism, as in some modern automobiles.

The principal objects of this invention are to provide an improved cover construction for preventing over-filling of the battery, substantially to prevent the throwing of acid spray, and to provide simplicity of construction, and facility of handling.

These and other objects will appear from the following description and the accompanying drawings.

Of the drawings:

Fig. 1 is a plan view of a three-cell storage battery such as is used in automobiles.

Fig. 2 is a vertical sectional view thereof, taken on line 2—2 of Fig. 1 with the vent plug in place.

Fig. 3 is a cross sectional view thereof, taken on line 3—3 of Fig. 2.

Fig. 4 is a vertical sectional view similar to Fig. 2, but with the vent plug removed.

Fig. 5 is a vertical sectional view of a modified form of the invention with the vent plug partly removed.

Fig. 6 is a cross sectional view thereof, taken on line 6—6 of Fig. 5, showing the valve member.

Fig. 7 is a vertical sectional view of another modification of the invention, with the vent plug in place.

Fig. 8 is a similar view of the same with the vent plug removed.

Fig. 9 is a perspective view of the valve member thereof.

Fig. 10 is a view similar to Fig. 7, showing a further modified form of the invention.

Fig. 11 is a similar view with the vent plug removed.

Fig. 12 is a cross-sectional view taken on line 12—12 of Fig. 11.

Fig. 13 is a perspective view of the valve member.

Fig. 14 is a view similar to Fig. 10, showing a further modification of the invention.

Fig. 15 is a view thereof with the vent plug removed.

Fig. 16 is a perspective view of the valve member thereof.

Referring to the drawings, the numeral 10 designates a battery container partitioned to provide a plurality of cells, each closed by a cell cover 11 having a filling opening closed by a vent plug 12. The cell covers are sealed to the container by bituminous material 13.

The present invention has to do with the construction of the vent well of the cell cover and generally comprises a vertical wall of the vent well extending from the cover to the normal level of the electrolyte, a vent plug therefor, and means associated with the wall of the vent well and sealing the wall against escape of gas when the vent plug is not in place but permitting gas to escape through the wall when the vent plug is in place. The invention may take many forms and may be illustrated by the forms shown in the drawings.

Referring to Figs. 2 to 4, the cell cover 11 is formed with a vent well 14 defining a filler opening 15 and extending downwardly to the normal level of the electrolyte. The opening 15 is internally threaded, as at 16 to receive a filler or vent plug 17 having a mating threaded portion. The wall of the vent well 14 is formed with one or more apertures 18 for venting gas to the vent well above the level of the electrolyte. These apertures are conveniently formed opposite to each other and are adapted to be closed by valve plugs 19 normally held in the apertures by a hard rubber spring 20. In the example shown, the spring is C-shaped and each end thereof carries a valve plug 19, while it is supported at its center by a lug 21 formed on the outer wall of the vent well.

The vent plug 17 is formed with a depending skirt 22 terminating in a rounded cam surface 23 at its lower margin. When the vent plug is removed, the spring 20 holds the valve plugs 19 in the apertures 18, thereby sealing the apertures. When the plug 17 is screwed into place the skirt 22 engages the inner ends of the valve plugs and forces them from their seats in the apertures against the spring 20, thereby permitting gases to escape through the apertures 18 into the vent well where they pass out through the vent 24 in the plug.

In the form of the invention shown in Figs. 5 and 6, a cell cover 25 is formed with a filler opening 26 defined by a vent well 27. An annular wall 28 is fixed to the cell cover wall around the wall of the vent well and concentric therewith and has an inwardly turned flange 29 at its lower margin. The wall of the vent well is formed with one or more apertures 30 therethrough. An annular ring 31 of elastic resilient material, such as soft vulcanized rubber substantially bridges the space between the wall of the vent well and the wall 28, resting upon the flange 29. A valve plug 32 of hard rubber fits an aperture 30, its point extending therethrough, and is preferably integral with the ring 31 and carried thereby. The vent plug 33 has a depending skirt 34 adapted to engage the ends of the valve plugs 32 and force them radially from their seats when the plug is in place, the ring 31 being flexed by such movement.

In the form of the invention shown in Figs. 7 to 9, cell cover 35 is formed with a vent well 36 defining a filling aperture. The wall of the vent well has one or more vent apertures 37 formed therethrough. A valve member 38 comprising an annular soft rubber bushing partially split, as at 39, from its top downwardly, so as to be circumferentially discontinuous in its upper region, and having its outer face chamfered near the top, as at 40, is seated on an inwardly turned shoulder 41 of the vent well so as normally to close the apertures 37 therein. The vent plug 42 has a depending skirt 43 chamfered on its lower inner margin and engageable over the chamfer on the valve member 38. The arrangement is such that when the vent plug 42 is not in place the valve member 38 covers the apertures 37 and when the vent plug is in place its skirt 43 forces the valve member away from the vents 37 so as to permit the gas to pass through.

In the modification of the invention illustrated in Figs. 10 to 13, a cell cover 44 has a depending vent well 45 terminating in an inwardly turned flange 46. The vertical wall of the vent well is slotted vertically to form one or more radial apertures therethrough. The valve member comprises an elastic band 47 formed with integral radial ribs 48 adapted to extend inwardly through the slots when the band is tensioned around the vent well. The upper corners of the ribs 48 are rounded as at 49 providing cam surfaces adapted to engage the rounded margin of a skirt 50 depending from the vent plug 51. The arrangement is such that the band 47 normally covers and seals the slots in the vent well. When the vent plug is screwed into place, the skirt engages the ribs 48 and forces the band 47 locally away from the wall of the vent well adjacent the slots, permitting gases to pass through the slots.

In the form of the invention shown in Figs. 14 to 16, the cell cover 52 is formed with a depending vent well 53 defining a filling aperture. The wall of the vent well is slotted vertically as at 54 and terminates in an inwardly turned flange 55. Within the vent well is a soft rubber valve member 56 comprising an annular base 57 and an upper circumferentially discontinuous portion having a plurality of vertically disposed flaps 58, one adapted to cover each slot 54. Each flap has an integral vertical rib 59 on its outer face adapted to enter a slot 54 to guide the flap in its movements, and an annular rib 60 on its inner face adapted to be engaged by a skirt 61 on the vent plug 62. The arrangement is such that when the vent plug is not in place the flaps 58 cover and seal the slots 54 and when the vent plug 62 is screwed in place its skirt 61 presses against the ribs 60 on the flaps 58, bending the flaps away from the slots and permitting gas to pass through the slots.

In each form of the invention the insertion of the vent plug in the vent well automatically opens the side vents in the vent well, whereas when the plug is removed, the vent well is sealed as to its vertical walls and thereby prevents overfilling of the cell with water or acid.

The cell covers and vent plugs are ordinarily made of a rigid moldable plastic such as hard rubber composition or other acid resisting materials.

These and other modifications of the invention may be made without departing from the spirit of the invention as it is defined in the following claim.

I claim:

A cell cover assembly for a container for electrolyte comprising a cell cover provided with a vent and filling opening and a communicating well extending below the cover for determining a normal level of the electrolyte by providing a gas-trapping space adjacent said well above the electrolyte and below the cover, an aperture in the side wall of said well below the cover to provide for escape of gas from gas-trapping space to the interior of said well, a resilient sleeve member of rubber material seated within said well and normally closing said aperture, the resilient sleeve member being split from its upper edge downward and being locally bendable in a portion of its wall by virtue of its split construction and returnable to its aperture-closing position by virtue of the resilience of such wall itself, said sleeve member having a beveled upper outer edge face, and a vented plug adapted to engage in the top of said vent and filler well and having a depending beveled skirt adapted to engage the beveled edge of said sleeve member to deflect it radially from its vent-closing position when the plug is engaged in said well.

HARRY E. WANER.